United States Patent [19]
Steimle et al.

[11] Patent Number: 5,327,219
[45] Date of Patent: Jul. 5, 1994

[54] METHOD AND APPARATUS FOR REMOVING UNWANTED REFLECTIONS FROM AN INTERFEROMETER

[75] Inventors: Lawrence J. Steimle, Arcadia; David L. Thiessen, Pasadena, both of Calif.

[73] Assignee: The United States of America as represented by the Administrator of the National Aeronautics and Space Administration, Washington, D.C.

[21] Appl. No.: 883,957

[22] Filed: May 15, 1992

[51] Int. Cl.$^5$ .................... G01B 11/00; G01B 9/02
[52] U.S. Cl. .................... 356/359; 356/360; 356/345; 356/354
[58] Field of Search .................... 356/354–356, 356/359, 360, 345

[56] References Cited

U.S. PATENT DOCUMENTS

| | | | |
|---|---|---|---|
| 3,169,193 | 2/1965 | Strang | 356/356 |
| 3,469,924 | 9/1969 | Haswell | 356/106 |
| 3,836,257 | 9/1974 | Matsumoto | 356/356 |
| 3,904,295 | 9/1975 | Hock et al. | 356/354 |
| 4,676,642 | 6/1987 | French | 356/346 |
| 4,682,892 | 7/1987 | Chawla | 356/353 |
| 4,722,604 | 2/1988 | French et al. | 356/345 |
| 4,743,118 | 5/1988 | Tsuchiya et al. | 356/353 |
| 4,890,914 | 1/1990 | Templeton | 356/35.5 |
| 5,018,861 | 5/1991 | Remo | 356/353 |

FOREIGN PATENT DOCUMENTS

47703 3/1977 Japan .................... 356/354

Primary Examiner—Robert J. Warden
Assistant Examiner—Christopher Y. Kim
Attorney, Agent, or Firm—John H. Kusmiss; Thomas H. Jones; Guy M. Miller

[57] ABSTRACT

A device for eliminating unwanted reflections from refractive optical elements in an optical system is provided. The device operates to prevent desired multiple fringe patterns from being obscured by reflections from refractive elements positioned in proximity to a focal plane of the system. The device exploits the 180-degree offset, or rotational shear, of the undesired reflected light by providing an optical stop for blocking one-half of the cross-section of the test beam. By blocking one-half of the test beam, the undesired offset beam is blocked, while the returning transmitted beam passes into the optical system unaffected. An image is thereby produced from only the desired transmitted beam. In one configuration, the blocking device includes a semi-circular aperture which is caused to rotate about the axis of the test beam. By rotating, all portions of the test beam are cyclically projected into the optical system to thereby produce a complete test image. The rotating optical stop is preferably caused to rotate rapidly to eliminate flicker in the resulting image.

18 Claims, 4 Drawing Sheets

METHOD AND APPARATUS FOR REMOVING UNWANTED REFLECTIONS FROM AN INTERFEROMETER

ORIGIN OF THE INVENTION

The invention described herein was made in the performance of work under a NASA contract, and is subject to the provisions of Public Law 96-517 (35 U.S.C. Section 202) in which the Contractor has elected not to retain title.

TECHNICAL FIELD

The invention generally relates to optical systems producing overlapping optical fringe sets.

BACKGROUND ART

In a wide variety of optical systems, it is desirable to be able to detect sets of optical interference fringes. One such system, the interferometer, is commonly used to test optical systems for proper alignment of optical components and imperfections in optical components.

Figures 1, 2:
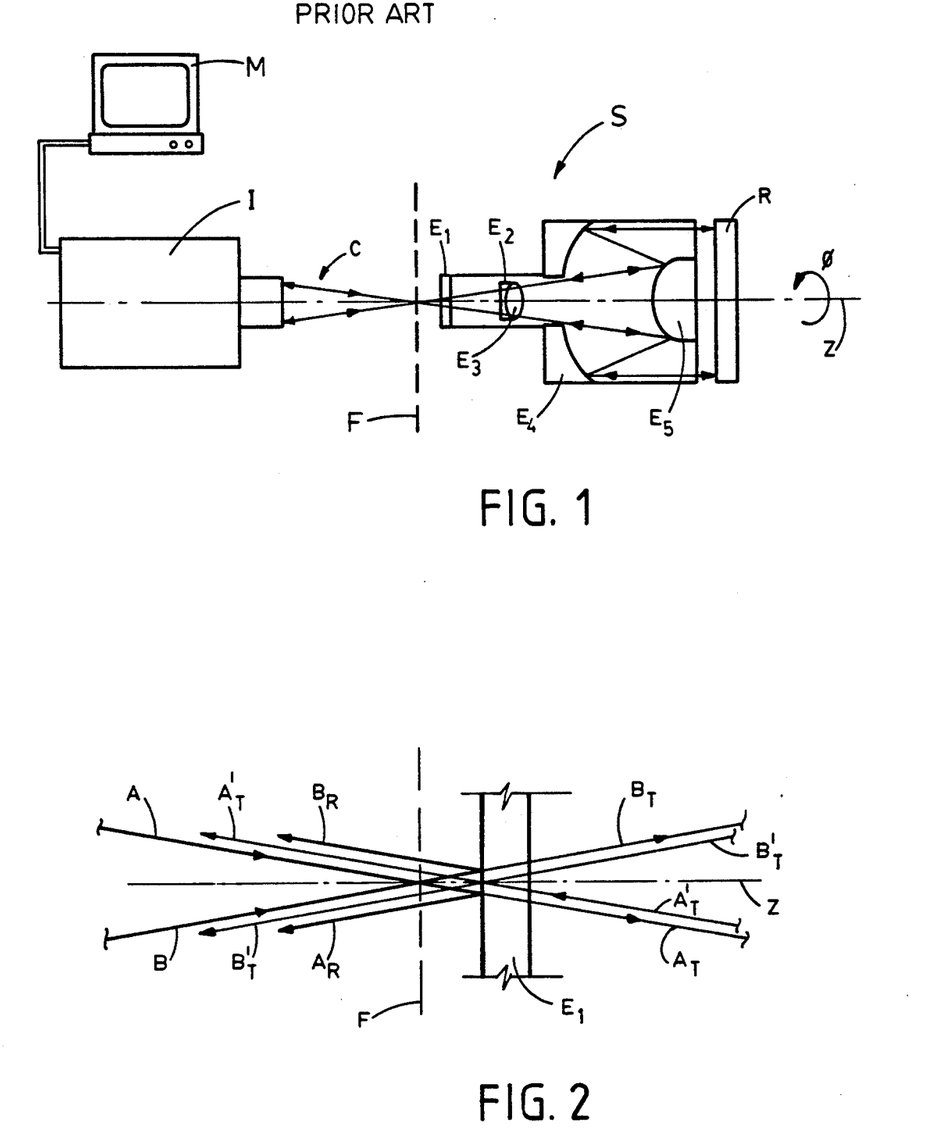
FIG. 1 provides a schematic view, somewhat in pictorial form, of a prior art interferometric test apparatus.
FIG. 2 provides a schematic representation of a portion of the prior art embodiment of FIG. 1, showing the behavior of transmitted and reflected light rays in the vicinity of a focal plane of the system.

A conventional interferometer test apparatus is shown in FIG. 1. An interferometer I generates a coherent beam of light C which is projected along an optical path through an optical system S to be tested. Optical system S includes various optical elements, generally denoted E. Interferometer I and optical system S are aligned along an azimuthal axis Z.

Initially, collimated beam C passes through a focal plane F located in close proximity to a refractive optical element $E_1$. Coherent beam C then enters optical system S through optical element $E_1$, and is subsequently refracted through, or reflected from, the remaining elements as it follows the optical path of the system.

A reflector R is positioned on an opposing end of the optical system to reflect coherent beam C back through the optical system. The reflected coherent beam follows the same optical path, but in a reverse direction, and ultimately reenters interferometer I.

Interferometer I combines the returned coherent beam C with a reference beam (not shown) to generate an interferometric image having a plurality of interference fringes. The configuration of the interference fringes provides information as to the alignment and quality of the optical system S. The interferometric image is detected and displayed on a television monitor M.

In an interferometer test apparatus such as the one shown in FIG. 1, it is critical that interference fringes, other than those caused by imperfections in the system under test, be substantially eliminated. Unfortunately, due to the proximity of optical element $E_1$ to focal plane F, unwanted reflections from element $E_1$ combine with the returned portion of the coherent beam to obscure desired fringes in the resulting interferometric image. This effect is shown most clearly with reference to FIG. 2, which provides a closeup view of the prior art system of FIG. 1, showing the focal plane F, a portion of optical element $E_1$, and various components of exemplary optical rays A and B.

Optical ray A passes through focal plane F and into optical element $E_1$. At the leading surface of optical element $E_1$, optical ray A is split into two components, a transmitted ray $A_T$ and a reflected ray $A_R$. Transmitted ray $A_T$ continues along the optical path of the system and is eventually reflected by reflecting surface R for return along the optical path (FIG. 1).

A return portion $A'_T$ of transmitted ray $A_T$ is also shown in FIG. 2. For clarity, return ray $A'_T$ is shown parallel to, but offset from, outgoing ray $A_T$. However, it should be understood that return transmitted ray $A'_T$ returns along substantially the identical path as outgoing transmitted ray $A_T$.

Return ray $A'_T$ passes through element $E_1$ and continues, as shown, for return to interferometer I. Optical ray B is likewise split into a transmitted beam $B_T$ and a reflected beam $B_R$. Transmitted beam $B_T$ passes through the optical system and then returns as beam $B'_T$. Beam $B'_T$ returns along the same optical path and again passes through optical element $E_1$ and continues on to interferometer I.

As a result of the angle of reflection from optical element $E_1$, reflected ray $A_R$ emerges parallel with return transmitted ray $B'_T$. Likewise reflected ray $B_R$ emerges parallel with return transmitted ray $A'_T$. Thus the reflected portion of coherent beam C emerges 180 degrees opposite from the return transmitted portion of coherent beam C. In other words, the coherent beam is rotationally sheared. Consequently, the reflected portion of rays A and B interfere with the return transmitted portions of beams B and A, respectively, to produce interference fringes which obscure the fringes of interest.

Reflections also occur at the trailing edge of element $E_1$ and from the leading and trailing surfaces of all refractive elements along the optical path. These other reflections may also produce interference fringes which obscure desired fringes. However, for clarity, only reflections from the leading edge of optical element $E_1$ are shown in FIG. 2.

Further, although this interference effect is shown by way of an example having a flat optical element, undesired reflections from curved refractive optical elements also obscure desired interference fringes, especially curved elements which have large radii of curvature.

Since the optical element $E_1$ is offset slightly from focal plane F, the reflected portion of light rays A and B emerge slightly radially offset from the transmitted portions of light rays A and B. If the optical element $E_1$ is sufficiently far from focal plane F, then the reflected portion of light rays A and B may be sufficiently offset from the transmitted portions of rays A and B such that the unwanted rays do not enter interferometer I and, hence, do not cause distortion to the interferometric test.

Whether reflections from optical elements which are remote from the focal plane ultimately enter the interferometer to obscure desired fringes depends on the geometry of the optical system.

Typically, coherent beam C must be focused at the optical focus of the system to be tested. For many optical systems, the focus is at a point close to at least one refractive element of the system and the thus-described problem therefore occurs. Accordingly, it is highly advantageous to provide a means for eliminating the problem.

Although described with respect to interferometers, the problem of unwanted reflections from refractive optical elements affecting an optical image occurs in numerous applications and with numerous optical systems. Generally, the problem may occur in any optical system where a light beam is twice passed through a refractive optical element.

STATEMENT OF THE INVENTION

Thus, it is an object of the present invention to provide a means for eliminating unwanted interference fringes caused by reflection from refractive optical components along an optical path of an optical system.

It is another object of the invention to provide an inexpensive and reliable mechanical mechanism for substantially eliminating the aforementioned unwanted interference fringes.

It is yet another object of the invention to incorporate the means for eliminating the unwanted interference fringes into an interferometric test apparatus.

It is another object of the invention to provide a nonmechanical means for eliminating the unwanted interference fringes such that mechanical vibration to the optical system is avoided.

These and other objects of the invention are achieved by an optical apparatus having a dynamic aperture blocking means placed within the optical path of a light beam projected into and reflected from an optical system. The apparatus also includes an optical source for generating the optical beam and for projecting the optical beam into the optical system, and a detector means for detecting the optical beam reflected out of the optical system. The dynamic aperture cyclically blocks half of the light beam as it enters the optical system and eliminates fringe effects caused by unwanted reflection from an optical element positioned along the optical path.

In accordance with the preferred embodiment, the dynamic aperture blocking means is incorporated within an interferometric test apparatus for testing an optical system. The test apparatus produces a coherent light beam and splits the coherent light beam into a reference beam and a test beam. The test beam is projected along an optical path through the optical system to be tested.

An aperture blocking means is provided within the optical path of the test beam. The aperture blocking means cyclically blocks one-half of a cross-section of the test beam such that only an unblocked portion traverses the optical path of the system and emerges from an exit aperture of the system. The test beam is then reflected back into the exit aperture of the optical system and returned to the interferometer along the same optical path. The returned unblocked portion of the test beam is received and compared with the reference beam to detect interference fringes.

Unwanted interference fringes occur as a result of reflections from surfaces of refractive elements positioned along the optical path, particularly when the focus of the optical system lies near at least one refractive element of the optical system. Although the refractive element near the focus transmits most of the test beam into the remainder of the optical system, a portion of the test beam is reflected from a surface of the refractive element and returns to the interferometer. The transmitted portion of the beam traverses the optical system and emerges from an exit aperture of the system. The transmitted beam is then reflected back through the optical system, and finally emerges from the optical system through the leading element of the system.

Thus, two beams return to the interferometer from the refractive element near the focus of the system, i.e., the beam that is transmitted into, and returned by, the optical system and the beam that is reflected directly from the refractive element. As a consequence of Snell's Law, the reflected portion emerges at an azimuthal angle 180-degrees opposite from the original azimuthal angle of the outgoing test beam. The transmitted portion reflects through the optical system and emerges parallel to the original outgoing test beam.

Thus the reflected portion reflects from the leading element at an azimuthal angle 180 degrees opposite from the returned transmitted portion. In other words, a portion of the wavefronts of the coherent test beam are rotationally sheared by 180 degrees.

The invention exploits the fact that the undesired reflected light is offset by an azimuthal angle of 180 degrees from the desired transmitted light. To this end, the invention provides an aperture blocking means for cyclically blocking one-half of the cross-section of the coherent test beam. One-half of the coherent test beam is always blocked, and light rays azimuthally offset by 180 degrees are not simultaneously allowed to pass through the blocking means. Only the desired transmitted portion of the coherent optical beam is allowed to enter the optical system and ultimately return to the interferometer through the blocking means to produce an interferometric test image. The undesired reflected portion of the coherent test beam is blocked. The blocking device acts as a fringe discriminator to selectively eliminate undesired interference fringes in the resulting test image.

To avoid loss of one-half of the resulting interferometric image, the aperture blocking means is provided with a switching means for cyclically advancing the location of the aperture. In a mechanical embodiment, the aperture blocking means includes one or more rotating wedge-shaped apertures. The wedge-shaped apertures are aligned along the azimuthal axis of the coherent light beam and rotates about the azimuthal axis. As a result, the rotating apertures cyclically block one-half of the coherent light beam. The mechanical aperture is caused to rotate at least 35 times a second, such that a resulting interferometric image may be viewed without flicker. Thereby, the entire interferometric image may be displayed without any apparent obstruction of the optical path.

Although summarized primarily with reference to an interferometric test apparatus, the dynamic aperture blocking means of the invention may be advantageously employed in any optical apparatus where an optical image is affected by unwanted reflections which are rotationally sheared from desired portions of an optical beam.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE INVENTION

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to set forth a means for substantially eliminating unwanted interference fringes caused by reflection from a refractive optical element positioned along an optical path of an optical system.

Referring to FIGS. 3-6, preferred embodiments of the invention will now be described.

Figure 3:
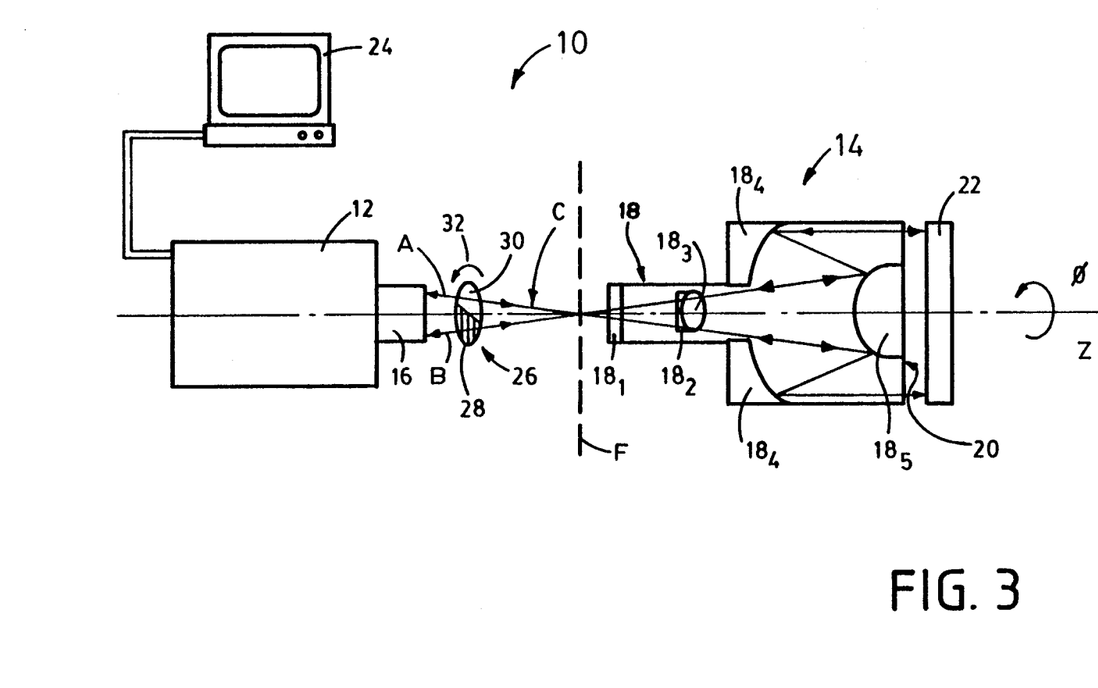
FIG. 3 provides an interferometer test apparatus in accordance with an embodiment of the present invention, showing the location of a dynamic aperture blocking device provided to eliminate certain unwanted interference fringes.

In FIG. 3, an optical apparatus comprising an interferometer test apparatus 10 is shown. Test apparatus 10 includes an interferometer 12 for generating a coherent test beam C having a plurality of optical rays for projection into an optical system 14. Interferometer 12 includes a focusing lens 16 for focusing coherent test beam C on a focal plane F. Coherent beam C is azimuthally symmetric about a system axis Z and exhibits a generally circular cross-section taken perpendicular to azimuthal axis Z.

Optical system 14 includes a variety of optical elements generally denoted 18, each aligned along azimuthal axis Z. Coherent beam C follows an optical path through optical system 14 along axis Z, represented by exemplary light rays A and B.

Coherent beam C enters optical system 18 through a leading refractive optical element $18_1$ and is refracted by, or reflected from, the remaining optical elements until it emerges from an exit aperture 20.

A reflector 22 is positioned adjacent to exit aperture 20 for reflecting coherent beam C back through optical system 14. The reflected coherent beam C retraverses the entire optical path and emerges from optical system 14 through leading element $18_1$. Reflected coherent beam C is refocused along focal plane F before reentering interferometer 12 through focusing element 16.

Although not shown in FIG. 3, interferometer 12 includes means for combining coherent test beam C with a reference beam. Interferometer 12 also includes a sensor for detecting an interferometric test pattern resulting from the combination of coherent beam C and the reference beam for display on a video monitor 24. Alternatively, the interferometric test pattern may be displayed on any conventional video display means or recorded on a photographic plate or video tape.

Thus, interferometric test apparatus 10 is similar to the test apparatus of the prior art described with reference to FIG. 1. However, test apparatus 10 includes a dynamic aperture blocking device 26 for cyclically blocking half of coherent beam C.

Blocking device 26 includes a semicircular optical stop 28 and a semicircular optical aperture 30 and is centered on azimuthal axis Z such that semicircular optical stop 28 blocks one-half of coherent beam C, while optical aperture 30 permits the other half of coherent beam C to pass into optical system 14.

In FIG. 3, for clarity, blocking device 26 is shown at an angle with respect to azimuth axis Z to reveal the configuration of the device. However, it should be understood that blocking device 26 is preferably aligned perpendicular to azimuthal axis Z, and thereby perpendicular to the optical path of coherent test beam Co Blocking device 26 is shown more fully in FIG. 6(a).

As shown in FIG. 3, blocking device 26 is positioned between focusing means 16 and focal plane F, to block one-half of coherent beam C prior to entering leading optical element $18_1$.

As with the prior art system discussed above, focal plane F is in close proximity to leading optical element $18_1$. Leading optical element $18_1$ includes a generally flat leading surface which reflects a portion of coherent beam C back towards interferometer 12. However, unlike the prior art apparatus of FIG. 3 where the reflected portion of coherent beam C reenters interferometer 12 and produces interference fringes which obscure fringes of interest in the resulting interferometric test image, blocking device 26 effectively eliminates the undesired reflected portion of coherent beam C. The resulting detected interferometric test image is thus substantially unobscured by fringes produced by light reflected from optical element $18_1$. The means by which blocking device 26 achieves this result is shown and described with reference to FIGS. 4a and 4b.

Figure 4A:
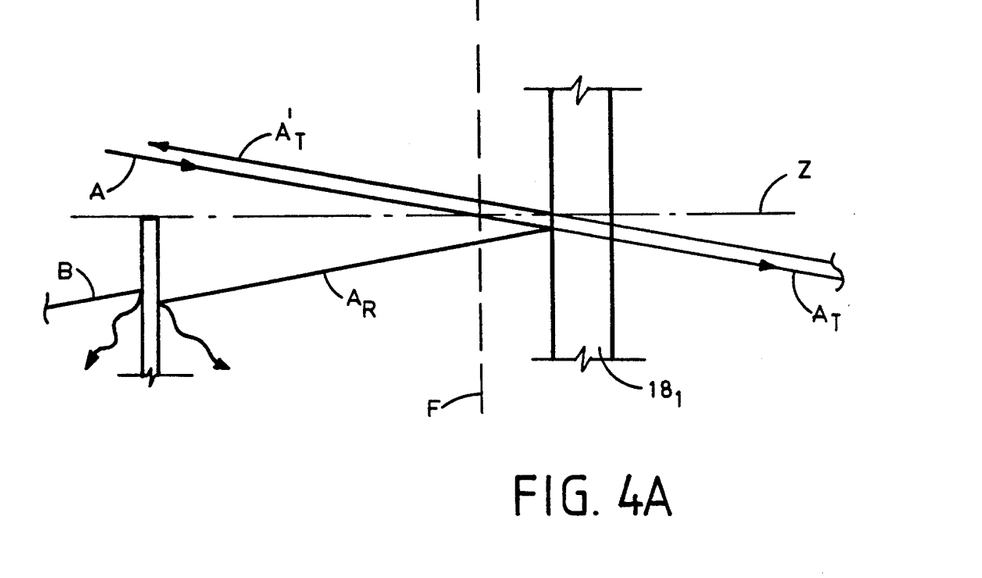
FIG. 4a is a schematic view of a portion of the embodiment of FIG. 1, showing the behavior of transmitted and reflected light rays in the vicinity of the focal plane of the system with the dynamic aperture blocking device oriented in a first position.

In FIG. 4a, blocking device 26 is shown in cross-section with optical stop 28 positioned entirely below azimuthal axis Z of coherent beam C. As with the embodiment of FIG. 3, an optical ray A having an initial azimuthal angle of $\phi=0$ degrees passes through focal plane F and enters leading optical element $18_1$. A portion $A_R$ of optical ray A reflects from the leading surface of optical element $18_1$ at an azimuthal angle 180 degrees opposite from optical ray A. The remaining portion of optical ray A is transmitted through element $18_1$. The transmitted portion $A_T$ traverses the optical path of optical system 14 and reflects from optical reflector 22 (FIG. 3), and returns along the path of optical ray A. The returned transmitted ray, denoted $A'_T$, reenters interferometer 12. Thus, return transmitted ray $A'_T$ has an azimuthal angle of 180 degrees opposite from reflected ray $A_R$. Unlike the embodiment of FIG. 1, reflected ray $A_R$ does not return to interferometer 12, but is blocked by optical stop 28. Likewise, all of optical ray B having an initial azimuthal angle $\phi=180$ degrees is blocked by optical stop 28. Thus, optical ray B does not reach leading element $18_1$. Accordingly, no reflected beam $B_R$ is produced for return to interferometer 12 along the path of optical ray A.

Thus, of azimuthally opposing rays A and B, only the transmitted portion of optical ray A contributes to the resulting interferometric test image. The resulting test image is unaffected by either a reflected ray $A_R$ or a reflected ray $B_R$.

Figure 4B:
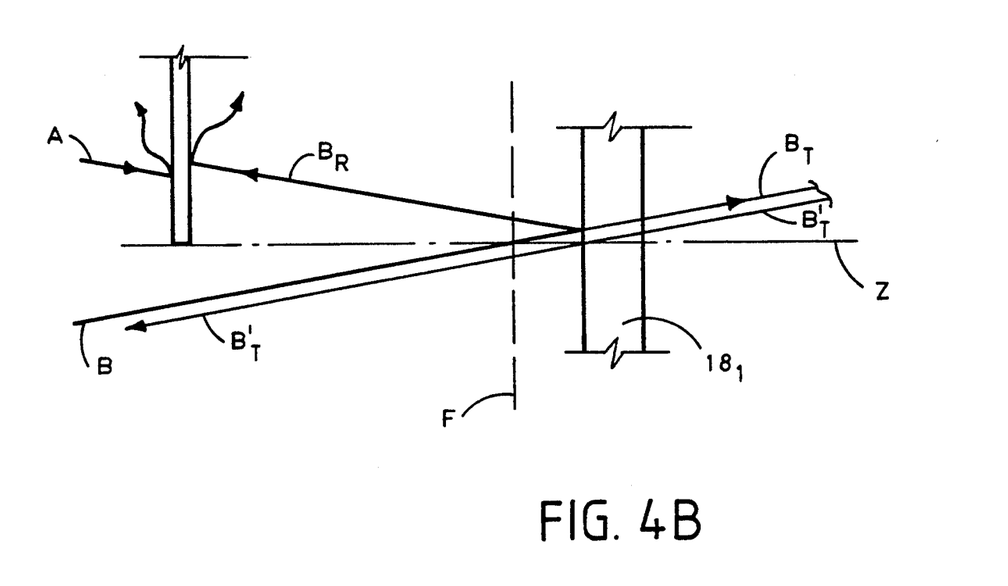
FIG. 4b provides a schematic view of a portion of the embodiment of FIG. 3, showing the behavior of optical rays with the dynamic aperture blocking device oriented in a second position.

In FIG. 4(b), blocking device 26 is shown with optical stop 28 rotated until entirely above azimuthal axis Z. This represents a configuration with open aperture 30 rotated by 180 degrees from that of FIG. 4(a) As can be seen in FIG. 4(b), optical ray A is entirely blocked by optical stop 28. Azimuthally opposing optical ray B passes unblocked into leading optical element $18_1$. A transmitted portion $B_T$ passes through element $18_1$, traverses optical system 14, and is ultimately reflected by reflector 22 (FIG. 3), as return ray $B'_T$, to interferometer 12 along the path of ray B.

The reflected portion $B_R$ reflects from the leading edge of element $18_1$ at an angle 180 degrees opposite from that of the return transmitted beam $B'_T$ while the reflected beam $B_R$ is blocked by optical stop 28.

Thus, with the optical stop 28 positioned above azimuthal axis Z, only that portion of coherent beam C initially projected below azimuthal axis Z contributes to the resulting test image. In this manner, the remainder of optical system 14 is tested.

Of course, coherent beam C comprises a continuum of optical rays covering all azimuthal axes from $\phi = 0$ to $\phi = 360$ degrees. Further, coherent beam C includes a continuum of optical rays extending from a radial distance $r = 0$ from the azimuthal axis to a radial distance of $r = R$ (not shown). Nevertheless, the semicircular configuration of blocking device 26 assures that only one-half of all optical rays enter optical system 14 and return to interferometer 12 for producing a test image.

The semicircular configuration of blocking device 26 assures that, for each optical ray $A(r,\phi)$, the opposing ray $A(r,\phi + 180$ degrees) is blocked. Since one-half of all optical rays within coherent beam C are blocked, only one-half of optical system 14 is tested. To produce an interferometric test image for the entire optical system 14, open aperture 30 is caused to rotate cyclically about azimuthal axis Z. The rotation of blocking device 26 is shown by arrow 32 of FIG. 3. As blocking device 26 rotates, aperture 30 rotates to permit all rays of coherent beam C to cyclically enter optical system 14. To illustrate this effect, both rays A and B are shown, in FIG. 3, as traversing optical system 14. It should be understood that rays A and B do not simultaneously traverse the optical path.

Preferably, blocking device 26 rotates about azimuthal axis Z at a rate of at least approximately 35 rotations per second. At this rotational rate, the resulting optical image displayed on video monitor 24 provides the entire interferometric test image substantially unaffected by optical flicker. At a rotation rate of less than 35 rotations per second, the projected test image might show a certain amount of flicker. The unwanted interference fringes, however, are eliminated for rotational speeds less than 35 rotations per second, as well as for rotational speeds greater than 35 rotations per second.

If the test image is not to be displayed, but photographed, then the blocking device need not cyclically rotate 35 times per second. Rather, the aperture need be rotated or otherwise switched only once to achieve a complete exposure of the test image.

Figure 5:
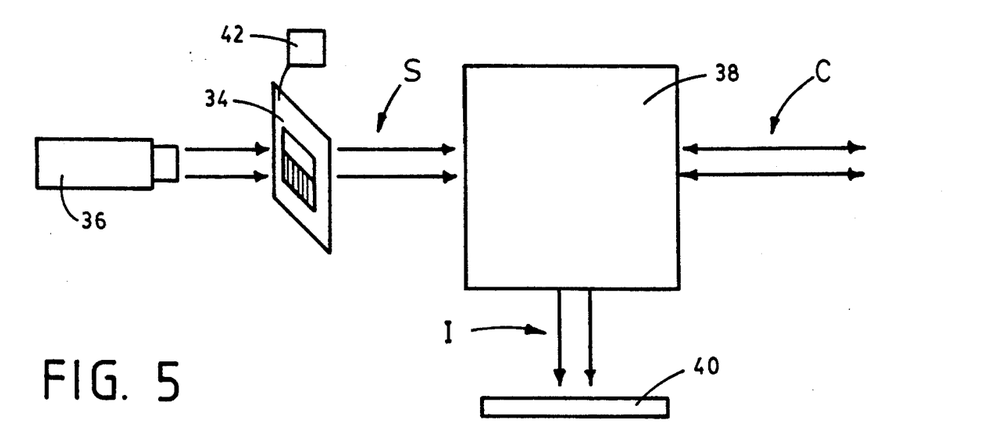
FIG. 5 is a schematic view, somewhat in pictorial form, of an interferometer constructed in accordance with an alternative embodiment of the invention.

Referring to FIG. 5, an alternative embodiment of the invention is shown. In the embodiment of FIG. 5, rather than providing a rotating aperture, a liquid crystal diode (LCD) optical valve is provided. LCD 34 comprises a conventional LCD device adapted to alternately activate a pair of adjacent rectangular regions. To this end, an electronic switching apparatus 42 is provided to alternately activate adjacent rectangular regions of the LCD device. The activated portion of the LCD blocks one-half of the coherent beam. In this manner, LCD-type optical valve 34 achieves the same results of rotating blocking device 26 without requiring any moving mechanical parts. LCD optical valve 34 thus operates without causing any unwanted mechanical vibration to the test system. Although shown in the drawings as having a pair of rectangular regions, LCD optical valve 34 may have regions of any shape so long as the azimuthal blocking conditions set forth above are satisfied.

However, LCD optical valve 34 may slightly degrade the wavefront of the coherent beam. This occurs because, unlike the rotating aperture of blocking device 26, which allows unblocked light to pass unaffected by an optical surface, the "open aperture" of LCD light valve 34 merely comprises an inactive "transparent" region of the device. The presence of the LCD surface, though substantially transparent, tends to slightly alter the wavefront of the coherent beam, and may affect the phase of the beam and degrade the resulting interferometric test image.

To eliminate this problem, LCD optical valve 34 is positioned within interferometer 12 rather than between interferometer 12 and focal plane F. Specifically, LCD optical valve 34 is positioned between the source of an initial coherent beam S and a beam splitter 38. Coherent beam source 36 typically comprises a laser. Beam splitter device 38 includes conventional optical components necessary to separate the coherent beam into a test beam, the aforementioned C, and a reference beam R, and includes means for merging the return test beam from the optical system with the reference beam to provide a single in-phase interfering beam I. A detector 40 detects the interfering image beam I to produce the test image, as discussed above. Since LCD optical valve 34 is positioned along the coherent beam before it is split into a reference beam and a test beam, it does not affect the test beam with respect to the reference beam. Any affect on beam S before entering splitter 38 does not affect the interferometric image.

As with the rotating blocking device of FIG. 3, LCD optical valve 34 preferably operates at a switching speed of at least 35 per second. Of course, conventional electronic switching devices allow far faster switching rates. Any switching rate above 35 per second can be used effectively. However, LCD optical valve 34 should not be switched at such a high rate that the light rays of coherent beam C cannot traverse the distance to leading element 18 and return before switching occurs. If such a high switching rate is utilized, the system may not effectively eliminate reflection from the leading optical element $18_1$.

In addition to the rotating blocking device of FIG. 3 and the LCD optical valve of FIG. 6, various other dynamic aperture devices can be used. Any such device is effective if it blocks at least one-half of the coherent test beam, and if, for each light ray $A(r,\phi)$ that is allowed to pass into the optical system, the opposing light ray $A(r,\phi + 180$ degrees) is blocked. With this condition met, a dynamic aperture device may have any configuration. For example, although not shown, a device can be configured to block more than one-half of the coherent beam. However, such a configuration would produce a dimmer resulting image with greater flicker without further eliminating distortion.

Figure 6A:
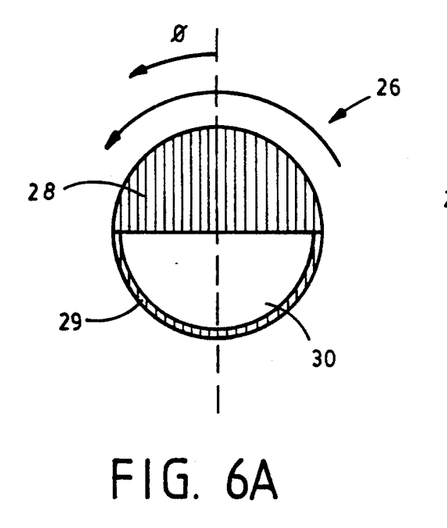
FIG. 6a is a side elevational view of the configuration of the dynamic aperture blocking device of FIG. 3.
Figure 6B:
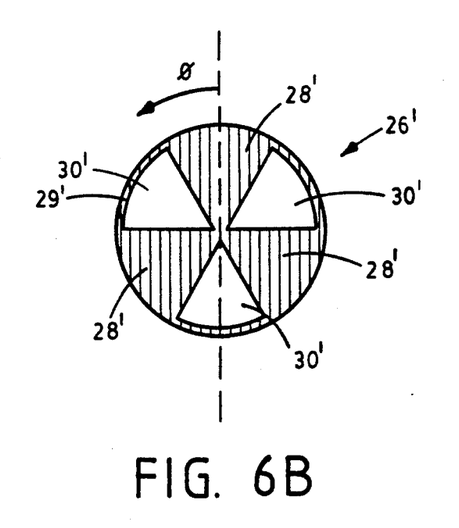
FIG. 6b is a side elevational view of the configuration of the dynamic aperture blocking device of FIG. 6.

Rotating blocking device 26 of the embodiment of FIG. 3 is shown more fully in FIGS. 6a and 6b. Semicircular optical stop 28 and semicircular optical aperture 30 are formed within a mounting ring 29. Optical stop 28 and mounting ring 29 may be constructed of a metal such as aluminum, and may be integrally formed. Preferably, optical stop 28 is substantially nonreflective. A nonreflection coating may be applied to optical stop 28 to ensure that reflection from optical stop 28 is substantially eliminated. A variety of means may be provided for rotating blocking device 26. For example, a pulley (not shown) may be mounted to an outside periphery of mounting ring 29 to impart rotation to the mounting ring. In such an embodiment, blocking device 26 is preferably mounted within an assembly (also not shown) which holds the blocking device upright within the optical path, yet allows smooth rotation of the device. This may be achieved by mounting a portion of mounting ring 29 within a peripheral slot formed within the mounting assembly. However, any of a variety of other drive means and mounting means may be provided, including gears, rollers, and the like.

A preferred embodiment 26' of the rotating blocking device is shown in FIG. 6(b). The device of FIG. 6(b) includes three fan-shaped optical stops or wedges 28' positioned diametrically opposite from three fan-shaped apertures 30' within a mounting frame 29'. This alternative embodiment satisfies the conditions set forth above. Therefore, when rotated in the optical path of a coherent test beam, blocking device 26' effectively eliminates distortion.

The embodiment of FIG. 6(b), however, has advantages over the embodiment of FIG. 6(a). The optical stops of alternative blocking device 26' of FIG. 6(b) are equally spaced about the azimuthal axis. This symmetric configuration tends to eliminate wobbling and mechanical vibration which may occur with the asymmetric configuration of blocking device 26 of FIG. 6(a). Further, the alternative blocking device of FIG. 6(b) can be rotated one-third as fast as the device of FIG. 6(a) while eliminating flicker. Thus, a slower motor drive may be used, further simplifying the system and eliminating mechanical vibration.

The blocking device may be further subdivided to allow an even slower rotation time. However, if too many finely spaced apertures are provided in the blocking device, the apertures will diffract coherent light beam C and thereby affect the resulting test image.

Although blocking device 26 of FIG. 3 is shown positioned between focusing element 16 and focal plane F, it should be understood that the device can be positioned at various other locations. For example, mechanical blocking device 26 can be positioned within the interferometer between coherent light source 36 and beam splitter 38. Alternatively, blocking device 26 can be positioned between focal plane F and leading optical element $18_1$. Of course, if blocking device 26 were positioned beyond optical element $18_1$, the problem would not be eliminated, because all portions of coherent beam C reflected from element $18_1$ would return unblocked to interferometer 12.

The particular configuration of optical system 14 should not be considered as limiting the use of the invention in any way. Optical system 14 can have any configuration. For example, alternative optical systems may include various optical elements positioned on either side of focal plane F. The invention works effectively for any system having at least one refractive element illuminated by a beam which traverses the element twice along a projection path. The beam may be any form of electromagnetic radiation capable of producing interference fringes. The optical beam need not be coherent. The system need not include an interferometer.

Further, as noted above in the Summary of the Invention, an optical image may be affected by unwanted reflections from any refractive element within the optical system. Although the problem is most acute when the refractive element is in proximity to the focal plane of the system, other refractive elements remote from the focal plane may also affect the resulting optical image. Whether a particular refractive element produces reflections which affect the optical image depends on the specific geometry of the system, including the radius of curvature of the surfaces of the refractive element. Additionally, it should be understood that both the leading and trailing surfaces of each refractive element produce reflections, some of which are not shown in the drawings for clarity. The dynamic aperture blocking device operates to eliminate unwanted reflections from all refractive elements in any system where the unwanted reflections are rotationally sheared as hereindescribed.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

We claim:

1. An optical apparatus having an optical system with at least one refractive optical element, the apparatus comprising:

an optical source for generating an optical beam and for projecting the optical beam along an optical path through the optical system, said optical beam being reflected back along the optical path through the optical system; and aperture blocking means centered on the optical beam between the optical source and the refractive element of the optical system for cyclically blocking at least half of the optical beam such that a portion of the optical beam reflected from the refractive element is prevented from interfering with a portion of the optical beam which is transmitted into, and reflected back out of, the optical system, the aperture blocking means transmitting that portion of the optical beam transmitted through the optical system while blocking any corresponding portion of the optical beam which could be reflected by the optical system.

2. An optical apparatus, comprising:

an optical source for generating an optical beam and for projecting the optical beam along an optical path through an optical system, with the optical system having at least one refractive optical element positioned along the optical path;

aperture blocking means, provided along an azimuthal axis of the optical path between the optical source and the refractive optical element, for cyclically blocking at least half of the optical beam, wherein azimuthally opposing portions of the light beam are alternately blocked;

means for reflecting the optical beam back along the optical path through the refractive optical element such that a portion of the optical beam reflected from the refractive element is prevented from interfering with a portion of the optical beam which is transmitted into, and reflected back out of, the optical system.

3. The optical apparatus of claim 2, wherein the aperture blocking means comprises a mechanical aperture having a rotating optical stop continuously blocking at least one-half of the cross-section of the optical path of the test beam.

4. The optical apparatus of claim 3, wherein the rotating optical stop comprises a semicircular stop centered on an optical axis of the optical system.

5. The optical apparatus of claim 3, wherein the rotating optical stop includes fan-shaped wedges separating fan-shaped apertures positioned centered on an optical axis of the optical system.

6. The optical apparatus of claim 5, wherein the fan-shaped apertures comprise three equally-spaced openings.

7. The optical apparatus of claim 2, wherein the aperture blocking means comprises an LCD-type optical valve.

8. The optical apparatus of claim 2, wherein the aperture blocking means is positioned between an exit aperture of the optical source and the optical element.

9. The optical apparatus of claim 2, wherein the optical beam is coherent.

10. The optical apparatus of claim 2, wherein the refractive element is in proximity to a focal plane of the optical system.

11. The optical apparatus of claim 8, wherein the optical beam is emitted by an interferometer.

12. The optical apparatus of claim 11, wherein the interferometer includes source means for generating a coherent beam and beam splitting means provided along an optical path of the coherent beam for splitting the coherent beam into a reference beam and a test beam, the test beam being projected from the interferometer into the optical system and through the optical element and being reflected back to the interferometer through the optical element.

13. The optical apparatus of claim 12, wherein the aperture blocking means is positioned along the optical path of the coherent beam between the source means and the beam splitting means such that the aperture blocking means does not affect the wavefront accuracy of the test beam with respect to the reference beam.

14. The optical apparatus of claim 2, wherein the aperture blocking means cyclically blocks one-half of the coherent beam at a rate of at least 35 cycles per second.

15. An optical apparatus comprising:
optical source means for producing a coherent beam;
means for splitting the coherent beam into a coherent reference beam and a coherent test beam;
means for projecting the test beam along an optical path through an optical system having at least one refractive optical element positioned in the vicinity of an optical focus of the optical system;
aperture blocking means aligned on an azimuthal axis of the test beam between the optical source means and the refractive element for cyclically blocking azimuthally opposing portions of the test beam, with an unblocked portion of the test beam entering the optical system and passing through the refractive element, thereby prohibiting any potential reflected portion of the test beam from the optical system corresponding to the unblocked portion which could be reflected by the optical system;
means for reflecting the unblocked portion of the beam back along the optical path through the refractive optical element;
means for receiving the unblocked portion of the test beam reflected back through the refractive optical element; and
means for comparing the test beam to the reference beam to detect optical interference occurring between the test beam and the reference beam.

16. A method for interferometrically testing an optical system having at least one refractive optical element positioned along an optical path, said method comprising the steps of:
producing a coherent beam;
splitting the coherent beam into a coherent reference beam and a coherent test beam;
projecting the test beam along the optical path through the optical system;
cyclically blocking azimuthally opposing portions of the test beam before the test beam passes through the refractive element, with only an unblocked portion of the test beam entering the optical system and passing through the refractive element, thereby prohibiting any potential reflected component of the test beam from the optical system corresponding to the unblocked portion which could be reflected by the optical system;
reflecting the unblocked portion of the beam back along the optical path through the optical system;
receiving the unblocked portion of the test beam reflected back through the optical system; and
comparing the test beam to the reference beam to detect optical interference occurring between the reference beam and the test beam.

17. The method of claim 16, wherein the step of blocking half of the test beam further comprises the steps of aligning a semicircular optical stop along the azimuthal axis of the optical path, and rotating the optical stop about the axis of the optical path to cyclically block azimuthally opposing light rays.

18. The method of claim 16, wherein the step of cyclically blocking half of the test beam is performed at a rate of at least 35 cycles per second.

* * * * *